US012725820B2

(12) United States Patent
Chae et al.

(10) Patent No.: US 12,725,820 B2
(45) Date of Patent: Sep. 1, 2026

(54) IONOMER FOR FUEL CELL CAPABLE OF SELF-ASSEMBLY AND METHOD OF PREPARING THE SAME

(71) Applicants: Hyundai Motor Company, Seoul (KR); Kia Corporation, Seoul (KR); UIF (University Industry Foundation), Yonsei University, Seoul (KR)

(72) Inventors: Il Seok Chae, Seoul (KR); Jong Kil Oh, Yongin-si (KR); Jong Hak Kim, Seoul (KR); Du Yeol Ryu, Seoul (KR); So Youn Lee, Seoul (KR)

(73) Assignees: Hyundai Motor Company, Seoul (KR); Kia Corporation, Seoul (KR); UIF (University Industry Foundation), Yonsei University, Seoul (KR)

( * ) Notice: Subject to any disclaimer, the term of this patent is extended or adjusted under 35 U.S.C. 154(b) by 665 days.

(21) Appl. No.: 18/308,988

(22) Filed: Apr. 28, 2023

(65) Prior Publication Data

US 2024/0178425 A1 May 30, 2024

(30) Foreign Application Priority Data

Nov. 8, 2022 (KR) ........................ 10-2022-0147862

(51) Int. Cl.
*H01M 8/1032* (2016.01)
*H01M 4/88* (2006.01)
(Continued)

(52) U.S. Cl.
CPC ......... *H01M 8/1032* (2013.01); *H01M 4/881* (2013.01); *H01M 8/1004* (2013.01);
(Continued)

(58) Field of Classification Search
None
See application file for complete search history.

(56) References Cited

U.S. PATENT DOCUMENTS

2011/0033776 A1* 2/2011 Fuchs ................ C08G 73/0694 528/125
2022/0016579 A1 1/2022 Jeong et al.

FOREIGN PATENT DOCUMENTS

CN 108232260 A 6/2018
KR 102193474 B1 12/2020
WO 2019079513 A1 4/2019

OTHER PUBLICATIONS

Adamski, M., et al., "On the evolution of sulfonated polyphenylenes as proton exchange membranes for fuel cells," Materials Advances, Royal Society of Chemistry, published Jul. 13, 2021, 40 pages.
(Continued)

*Primary Examiner* — Wyatt P Mcconnell
(74) *Attorney, Agent, or Firm* — Slater Matsil, LLP

(57) ABSTRACT

An embodiment ionomer for a fuel cell includes a copolymer having no carbon-oxygen bond, wherein the copolymer includes hydrophilic moieties disposed at both ends, wherein each hydrophilic moiety includes a styrene unit and a proton conductive functional group, and a hydrophobic moiety interposed between the hydrophilic moieties, wherein the hydrophobic moiety includes an ethylene-based unit, a butylene-based unit, an isoprene-based unit, or any combination thereof.

20 Claims, 7 Drawing Sheets

(51) Int. Cl.
*H01M 8/1004* (2016.01)
*H01M 8/1081* (2016.01)
*H01M 8/1086* (2016.01)
*H01M 8/10* (2016.01)

(52) U.S. Cl.
CPC ......... *H01M 8/1081* (2013.01); *H01M 8/109* (2013.01); *H01M 2008/1095* (2013.01); *H01M 2300/0082* (2013.01)

(56) References Cited

OTHER PUBLICATIONS

Bae, Joonwon, "Control of Microdomain Orientation in Block Copolymer Thin Films by Electric Field for Proton Exchange Membrane," Advances in Chemical Engineering and Science, Mar. 27, 2014, 8 pages.
Date, B., et al., "Synthesis and Morphology Study of SEBS Triblock Copolymers Functionalized with Sulfonate and Phosphonate Groups for Proton Exchange Membrane Fuel Cells," Macromolecules, Jan. 30, 2018, 11 pages.
Kolomanska, J., et al., "Design, synthesis and thermal behaviour of a series of well-defined clickable and triggerable sulfonate polymers," RSC Advances, Royal Society of Chemistry, published Jul. 27, 2015, 9 pages.
Wang, Z., et al., "Polystyrene-Block-Poly(ethylene-ran-butylene)-Block-Polystyrene Triblock Copolymer Separators for a Vanadium-Cerium Redox Flow Battery," Journal of The Electrochemical Society, 164 (4), Feb. 23, 2017, 8 pages.

* cited by examiner

IONOMER FOR FUEL CELL CAPABLE OF SELF-ASSEMBLY AND METHOD OF PREPARING THE SAME

CROSS-REFERENCE TO RELATED APPLICATIONS

This application claims the benefit of Korean Patent Application No. 10-2022-0147862, filed on Nov. 8, 2022, which application is hereby incorporated herein by reference.

TECHNICAL FIELD

The present disclosure relates to a hydrocarbon-based ionomer for fuel cells capable of self-assembly and a method of preparing the same.

BACKGROUND

A proton exchange membrane (PEM), which is a key material used in various energy conversion and storage devices including fuel cell systems, serves as an electrolyte and separator to selectively transfer only protons. Therefore, PEMs require properties such as high ionic conductivity, outstanding physicochemical stability, scalability, and low cost for production.

Currently, the most widely used PEMs include Nafion®, perfluorine-based electrolytes produced by DuPont and Gore-Select®, and a perfluorine-based porous membrane produced by Gore & Associates GmbH. These PEMs are used in most commercial or commissioning fuel cells, redox flow cells, electrochemical hydrogen compressor systems and the like due to high ionic conductivity and chemical stability thereof. However, conventional perfluorine-based PEMs have problems of decomposition by oxygen radicals, environmental pollution caused by hydrofluoric acid and pollutants during incineration, and high price due to complicated manufacturing processes.

Therefore, there is a need for development of a method for designing a polymer structure capable of self-assembly in a part that allows easy introduction of ion exchange functional groups and is responsible for ion transport and physicochemical stability and for synthetizing the polymer structure to realize the same in order to develop an electrolyte membrane that satisfies all of the above-described characteristics required for cation exchange membranes and can be applied to fuel cell systems.

The above information disclosed in this background section is provided only for enhancement of understanding of the background of embodiments of the invention, and therefore it may include information that does not form the prior art that is already known to a person of ordinary skill in the art.

SUMMARY

Embodiments of the present disclosure can solve problems associated with the prior art.

An embodiment of the present disclosure provides an ionomer for fuel cells capable of self-assembly and a method of preparing the same.

The embodiments of the present disclosure are not limited to those described above. Various embodiments of the present disclosure will be clearly understood from the following description, and are capable of being implemented by means defined in the claims and combinations thereof.

One embodiment of the present disclosure provides an ionomer for fuel cells including a copolymer having no carbon-oxygen bond, wherein the copolymer includes hydrophilic moieties disposed at both ends, and a hydrophobic moiety disposed therebetween, wherein each hydrophilic moiety includes a styrene unit, the hydrophobic moiety includes at least one selected from the group consisting of an ethylene-based unit, a butylene-based unit, an isoprene-based unit, and a combination thereof, and the hydrophilic moiety includes a proton conductive functional group.

The copolymer may have a micelle structure in which the hydrophobic moiety is located inside and the hydrophilic moiety is located outside.

The proton conductive functional group may include a sulfonic acid group.

The copolymer may include a compound represented by the following Formula 1:

Formula 1

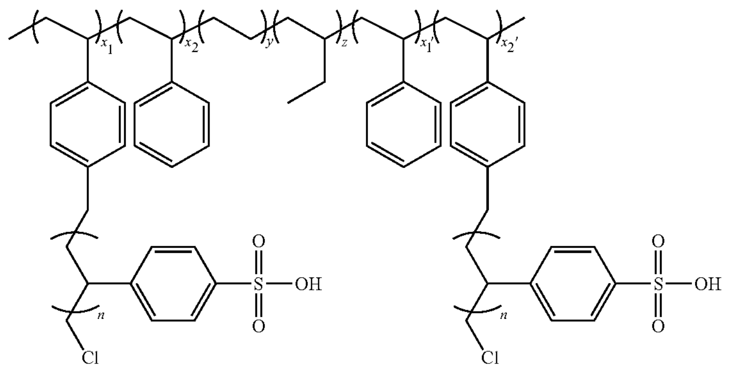

wherein $x_1=x\times a$, $x_2=x\times(1-a)$, a is a number from 0.1 to 0.9, and x is a number from 10 to 1,000, $x_1'=x'\times(1-a')$, $x_2'=x'\times a'$, a' is a number from 0.1 to 0.9, and x' is a number from 10 to 1,000, y is a number from 10 to 1,000, z is a number from 10 to 1,000, and n is a number from 2 to 12.

Another embodiment of the present disclosure provides a fuel cell including an electrolyte membrane, a cathode disposed on one surface of the electrolyte membrane, and an anode disposed on the other surface of the electrolyte membrane, wherein at least one of the electrolyte membrane, the cathode, and the anode includes the ionomer.

Another embodiment of the present disclosure provides a method for preparing an ionomer for a fuel cell including reacting a starting material including chloromethylated styrene ethylene-butylene styrene (CMSEBS) and a monomer having a sulfonic acid-protecting group to obtain an intermediate material represented by the following Formula 1a, and removing the sulfonic acid-protecting group from the intermediate material to obtain an ionomer represented by the following Formula 1:

Formula 1a

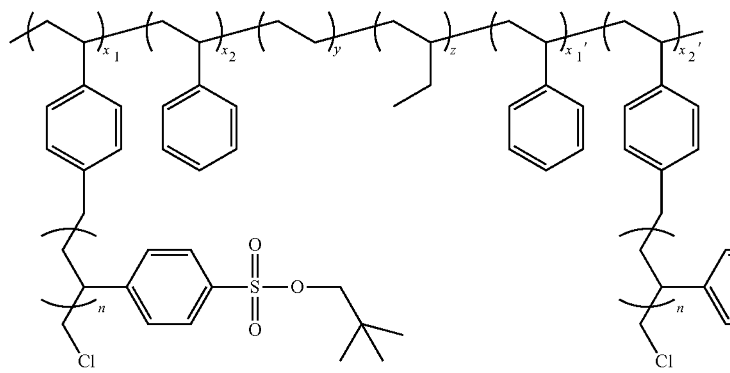

Formula 1

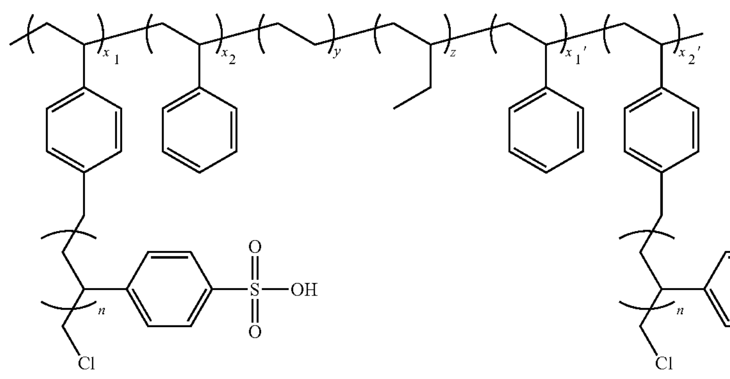

wherein $x_1=x\times a$, $x_2=x\times(1-a)$, a is a number from 0.1 to 0.9, and x is a number from 10 to 1,000, $x_1'=x'\times(1-a')$, $x_2'=x'\times a'$, a' is a number from 0.1 to 0.9, and x' is a number from 10 to 1,000, y is a number from 10 to 1,000, z is a number from 10 to 1,000, and n is a number from 2 to 12.

The monomer having a sulfonic acid-protecting group may include a compound represented by the following Formula 2:

Formula 2

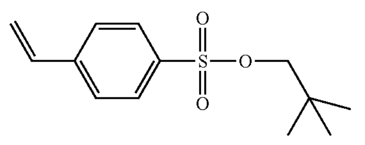

The starting material may further include copper halide and 2,2'-bipyridine.

The starting material may include the copper halide and the 2,2'-bipyridine in a mole ratio of 1:1 to 1:3.

The reaction of the starting material may be carried out at 50° C. to 150° C. for 1 hour to 48 hours.

The removal of the sulfonic acid-protecting group may be carried out by heat-treating the intermediate material at 100° C. to 200° C. for 1 hour to 4 hours.

Other aspects and preferred embodiments of the invention are discussed infra.

BRIEF DESCRIPTION OF THE DRAWINGS

The above and other features of embodiments of the present disclosure will now be described in detail with reference to certain exemplary embodiments thereof illustrated in the accompanying drawings which are given hereinbelow by way of illustration only, and thus are not limitative of the present disclosure, and wherein.

DETAILED DESCRIPTION OF ILLUSTRATIVE EMBODIMENTS

Figures 1, 2A:
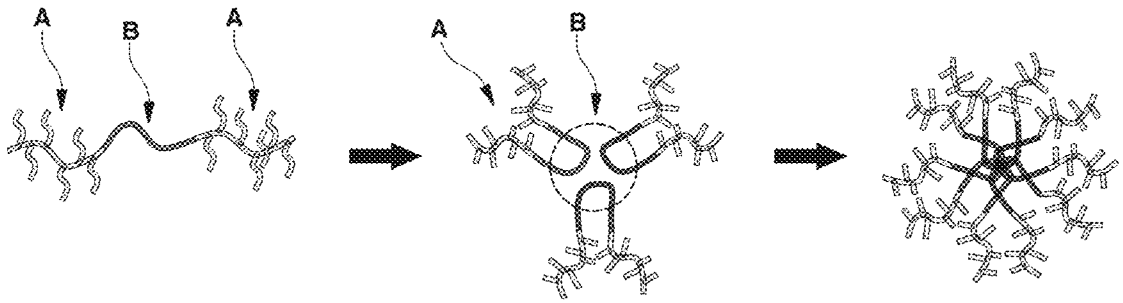
FIG. 1 shows self-assembly of an ionomer according to embodiments of the present disclosure.
FIG. 2A shows a membrane according to Example 1 (n=2)

The embodiments described above, and other embodiments, features and advantages, will be clearly understood from the following preferred embodiments with reference to the accompanying drawings. However, the present disclosure is not limited to the embodiments, and will be embodied in different forms. The embodiments are suggested only to offer a thorough and complete understanding of the disclosed contents and to sufficiently inform those skilled in the art of the technical concept of the present disclosure.

Like reference numbers refer to like elements throughout the description of the figures. In the drawings, the sizes of structures are exaggerated for clarity. It will be understood that, although the terms "first", "second", etc. may be used herein to describe various elements, these elements should not be construed as being limited by these terms, and are used only to distinguish one element from another. For example, within the scope defined by the present disclosure, a first element may be referred to as a second element, and similarly, a second element may be referred to as a first element. Singular forms are intended to include plural forms as well, unless the context clearly indicates otherwise.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element, or an intervening element may also be present. It will also be understood that, when an element such as a layer, film, region or substrate is referred to as being "under" another element, it can be directly under the other element or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things. For this reason, it should be understood that, in all cases, the term "about" should be understood to modify all numbers, figures and/or expressions. In addition, when numeric ranges are disclosed in the description, these ranges are continuous and include all numbers from the minimum to the maximum including the maximum within the ranges unless otherwise defined. Furthermore, when a range refers to integers, it includes all integers from the minimum to the maximum including the maximum within the range, unless otherwise defined.

The ionomer for a fuel cell according to embodiments of the present disclosure may include a hydrocarbon-based copolymer having no carbon-oxygen bond.

The copolymer may include hydrophilic moieties disposed at both ends and a hydrophobic moiety disposed therebetween. Based on this configuration, the ionomer may undergo self-assembly.

FIG. 1 shows self-assembly of the ionomer according to embodiments of the present disclosure. Since the ionomer includes the hydrophilic moieties (A) and the hydrophobic moiety (B), it may have a micelle structure in which the hydrophobic moiety (B) is located inside and each hydrophilic moiety (A) is located outside. The micelle structure is not limited to FIG. 1 and the hydrophilic moiety (A) may be located inside and the hydrophobic moiety (B) may be located outside depending on the polarity and type of the solvent.

The hydrophilic moiety may include a styrene unit.

The hydrophilic moiety may include a proton conductive functional group. The proton conductive functional group may include at least one selected from the group consisting of a carboxyl group, a phosphoric acid group, a sulfonic group, and a combination thereof, and may preferably include a sulfonic acid group.

The hydrophobic moiety may include at least one selected from the group consisting of an ethylene-based unit, a butylene-based unit, an isoprene-based unit, and a combination thereof.

The copolymer may include a compound represented by the following Formula 1.

Formula 1

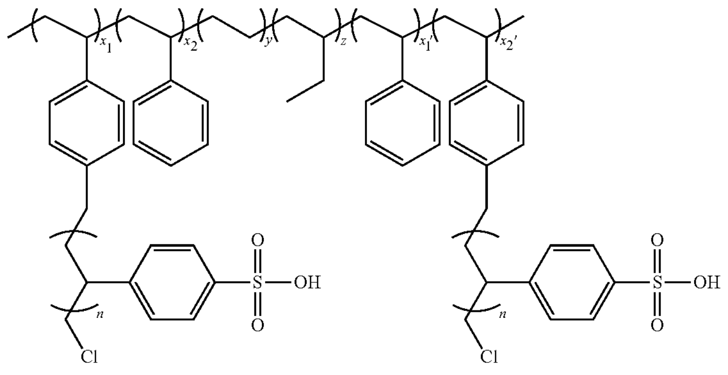

wherein $x_1=x\times a$, $x_2=x\times(1-a)$, a is a number from 0.1 to 0.9, x is a number from 10 to 1,000, x is the number of moles of the hydrophilic moiety located at one end of the copolymer, and a is a ratio of units substituted with a sulfonic acid group to such a hydrophilic moiety.

In Formula 1, $x_1'=x'\times(1-a')$, $x_2'=x'\times a'$, a' is a number from 0.1 to 0.9, x' is a number from 10 to 1,000, x' is the number of moles of the hydrophilic moiety disposed at the other end of the copolymer, and a' is a ratio of units substituted with a sulfonic acid group to such a hydrophilic moiety.

In Formula 1, y is a number from 10 to 1,000 and z is a number from 10 to 1,000.

In Formula 1, n is a number from 2 to 12. n indicates a graft degree and may mean the number of moles of monomers having a sulfonic acid-protecting group reacted with one halogen group.

The fuel cell according to embodiments of the present disclosure may include an electrolyte membrane, a cathode disposed on one surface of the electrolyte membrane, and an anode disposed on the other surface of the electrolyte membrane. At least one of the electrolyte membrane, cathode, and anode may include the ionomer.

A method for preparing an ionomer for a fuel cell according to embodiments of the present disclosure includes reacting a starting material including chloromethylated styrene ethylene-butylene styrene (CMSEBS) and a monomer having a sulfonic acid-protecting group to obtain an intermediate material and removing the sulfonic acid-protecting group from the intermediate material to obtain an ionomer represented by Formula 1.

The CMSEBS may be a compound represented by the following Formula 1b.

Formula 1b

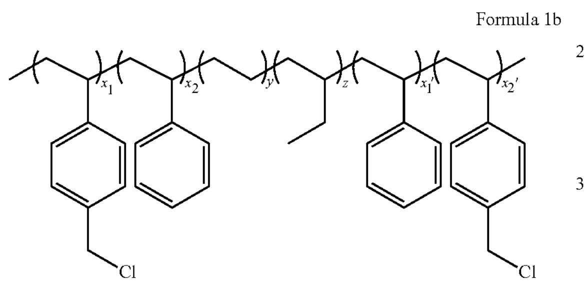

In Formula 1b, $x_1$, $x_2$, $x_1'$, $x_2'$, y and z are as defined in Formula 1.

The preparation method of the CMSEBS is not particularly limited. For example, SEBS represented by Formula 1c is dissolved in chlorobenzene, paraformaldehyde is added thereto and the temperature is elevated to about 55° C. The CMSEBS may be obtained by adding chlorotrimethylsilane and tin (IV) chloride to the resulting product, followed by reacting at about 80° C.

Formula 1c

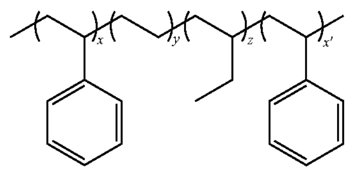

In Formula 1c, x, x', y and z are as defined in Formula 1.

The monomer having a sulfonic acid-protecting group may include a compound represented by the following Formula 2.

Formula 2

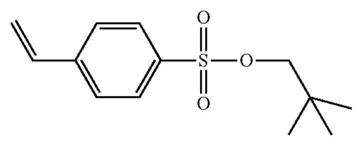

In the monomer, the sulfonic acid-protecting group may be a neopentyl group.

The starting material may further include copper halide and 2,2'-bipyridine. The copper halide is not particularly limited, but may include copper chloride (CuCl).

The starting material may include the copper halide and the 2,2'-bipyridine in a mole ratio of 1:1 to 1:3.

n in Formula 1 may be adjusted by appropriately changing the ratio between the monomer having the sulfonic acid-protecting group, the copper halide, and the 2,2'-bipyridine in the starting material.

The intermediate material represented by Formula 1a may be obtained by reacting the starting material at 50° C. to 150° C. for 1 hour to 48 hours.

Formula 1a

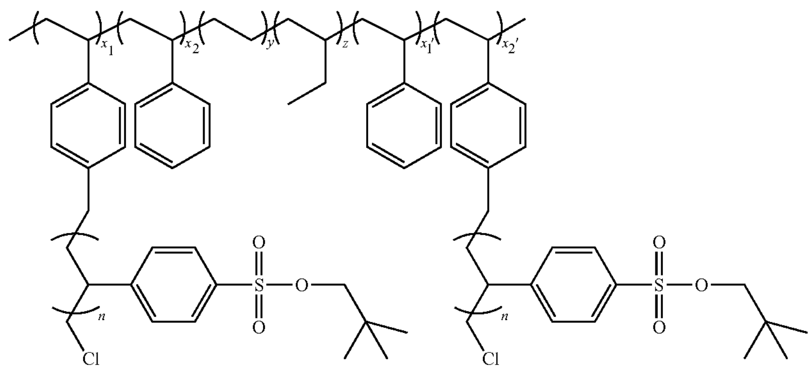

In Formula 1a, $x_1$, $x_2$, $x_1'$, $x_2'$, y and z are as defined in Formula 1.

The ionomer according to embodiments of the present disclosure may be obtained by removing the sulfonic acid-protecting group from the intermediate material.

The removal of the sulfonic acid-protecting group may be carried out by heat treatment or hydrolysis of the intermediate material and is preferably carried out by heat treatment. Specifically, the ionomer according to embodiments of the present disclosure may be obtained by removing the sulfonic acid-protecting group through heat treatment of the intermediate material at 100° C. to 200° C. for 1 hour to 4 hours.

In this case, the intermediate material may be dissolved in a solvent to obtain a solution, the solution may be coated on a substrate to prepare a membrane having a predetermined shape, and then the membrane may be heat treated to remove the sulfonic acid-protecting group.

PREPARATION EXAMPLES 1 TO 4

1 g of CMSEBS was dissolved in 15 mL of toluene, and then neopentyl styrene sulfonate, copper chloride (CuCl), and 2,2'-bipyridine were added to the solution, followed by purging with nitrogen gas for about 30 minutes to prepare a starting material. The copper chloride and 2,2'-bipyridine were added at a mole ratio of 1:1.5.

The starting material was allowed to react at 100° C. for 24 hours to synthesize intermediate materials in which n is 2 (Preparation Example 1), 5 (Preparation Example 2), 7 (Preparation Example 3), and 12 (Preparation Example 4).

Each intermediate material was precipitated in an excess of isopropyl alcohol. The result was repeatedly washed twice or more to remove residues such as copper chloride and then dried in an oven at about 50° C. to obtain an intermediate material.

EXAMPLES 1 to 4

0.3 g of the intermediate materials according to Preparation Examples 1 to 4 were weighed and each was dissolved in 3 mL of toluene to obtain a solution.

The solution was applied to a substrate to produce a membrane having a predetermined shape and the membrane was then dried in an oven at 50° C. The membrane-formed substrate was immersed in a water bath to separate the membrane.

Figure 2B:
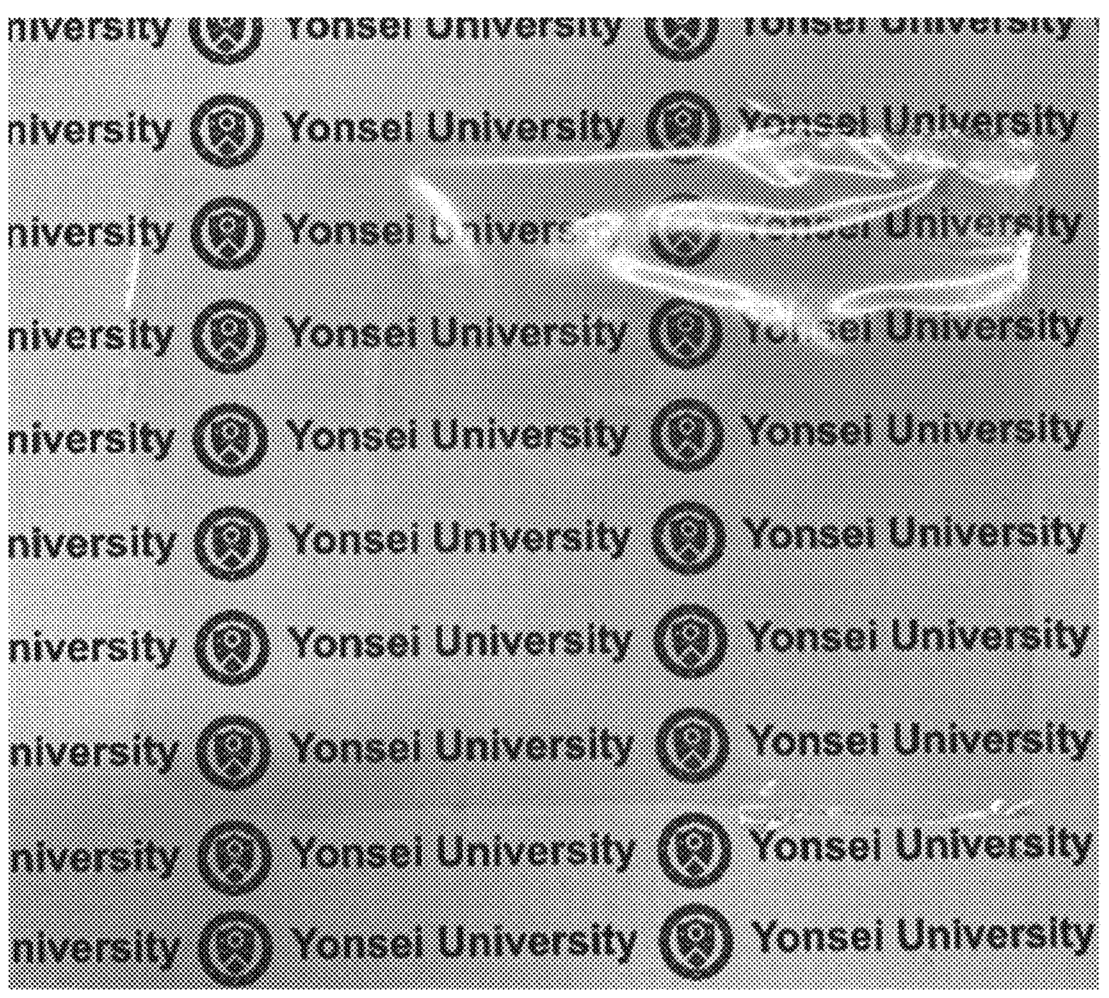
FIG. 2B shows a membrane according to Example 2 (n=5)
Figure 2C:
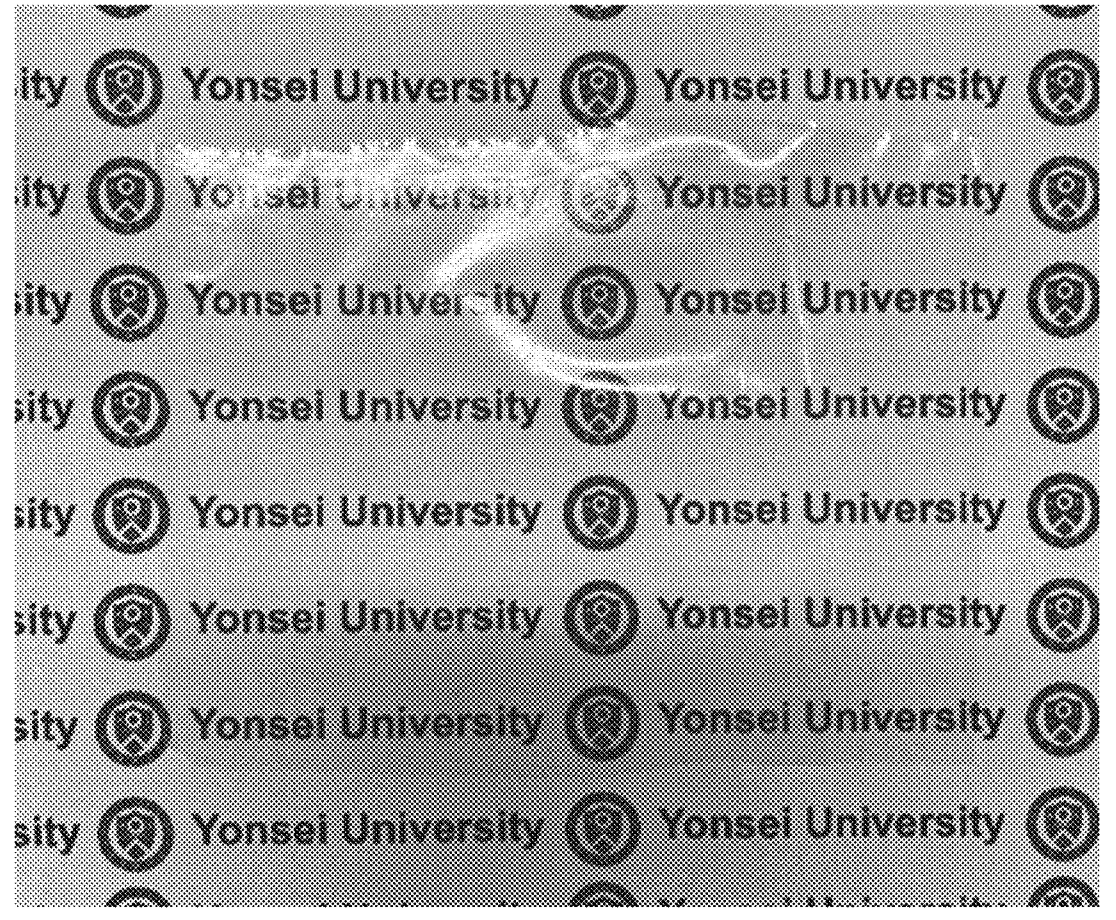
FIG. 2C shows a membrane according to Example 3 (n=7)

FIG. 2A shows the membrane according to Example 1 (n=2). FIG. 2B shows the membrane according to Example 2 (n=5). FIG. 2C shows the membrane according to Example 3 (n=7). As the value of n decreases, flexibility increases, but physical properties such as strength are lowered.

Each of the membranes was placed in a furnace, heat-treated at about 150° C. for about 2 hours to remove the sulfonic acid-protecting group and washed to prepare an electrolyte membrane including the ionomer according to embodiments of the present disclosure.

Figure 3:
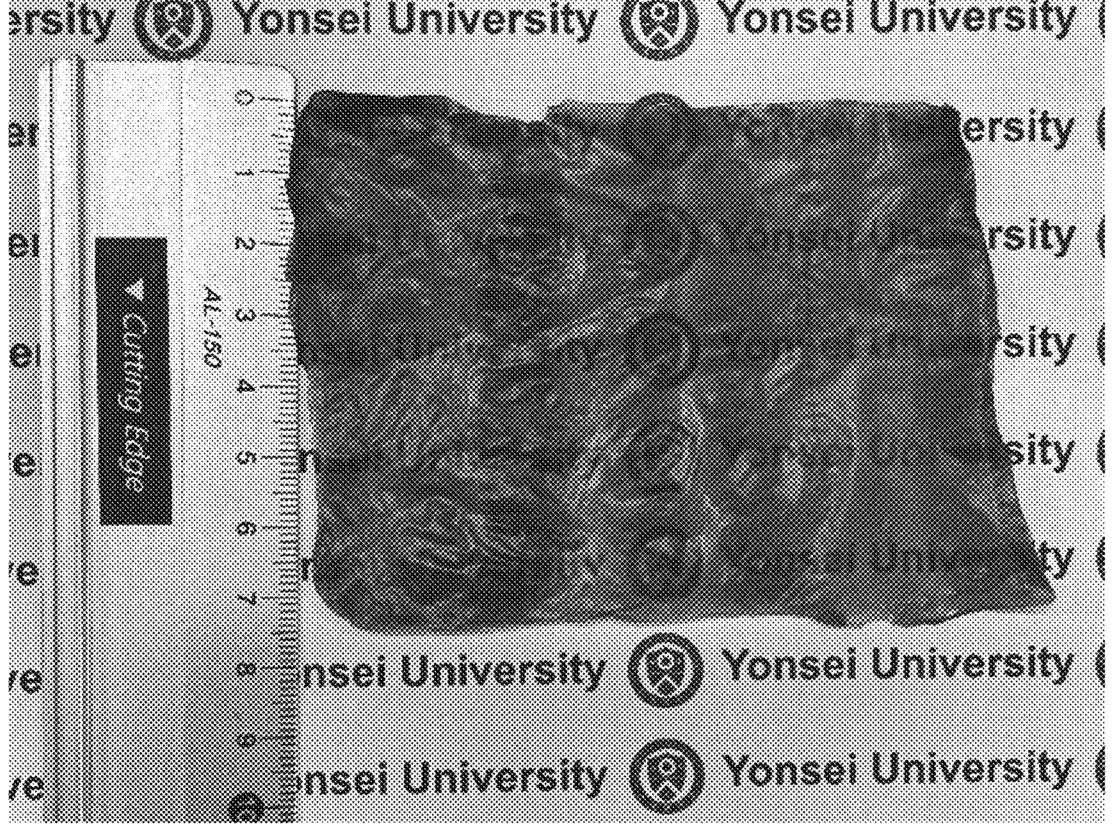
FIG. 3 shows an electrolyte membrane according to Example 2 (n=5)

FIG. 3 shows the electrolyte membrane according to Example 2 (n=5).

Figure 4:
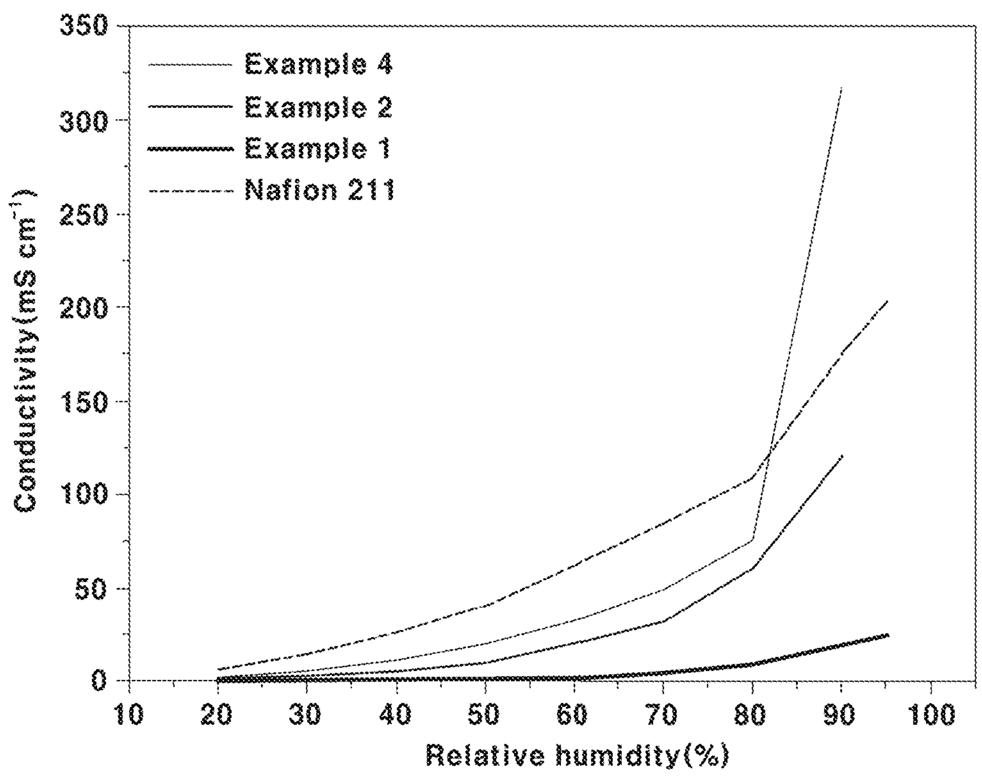
FIG. 4 shows proton conductivity of the electrolyte membranes according to Examples 1, 2 and 4, and Nation 211.

FIG. 4 shows proton conductivity of the electrolyte membranes according to Examples 1, 2 and 4 and Nation 211. The proton conductivity is shown as a function of relative humidity at 80° C. in an in-plane direction. The proton conductivity is shown in Table 1 below.

TABLE 1

| | Proton conductivity [mS/cm] | |
|---|---|---|
| Item | Relative humidity 50% | Relative humidity 90% |
| Nafion 211 | 40.9 | 175.5 |
| Example 1 (n = 2) | 1.2 | 19.2 |
| Example 2 (n = 5) | 10.1 | 120.5 |
| Example 4 (n = 12) | 20.0 | 317 |

Under high humidity conditions (90% relative humidity), Example 4 has higher proton conductivity than Nation 211. In addition, it can be seen that the proton conductivity improves as the degree of grafting increases.

Figure 5:
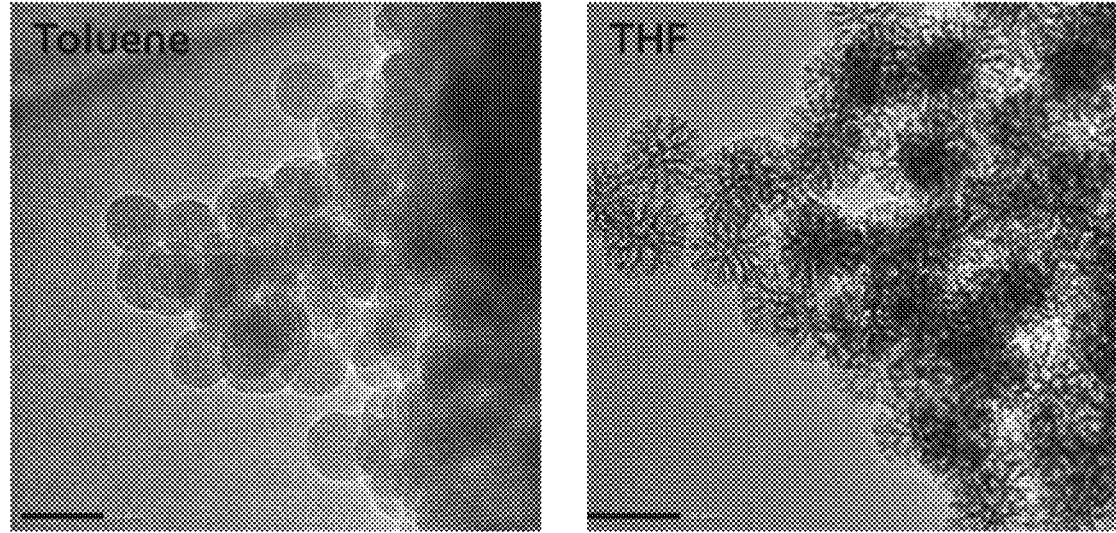
FIG. 5 shows self-assembly behavior of the ionomer according to Example 2.

FIG. 5 shows the self-assembly behavior of the ionomer according to Example 2. The ionomer was added to toluene and tetrahydrofuran, and the result was analyzed by scanning electron microscopy. It can be seen that the ionomer has a micelle structure in a solvent.

Figure 6A:
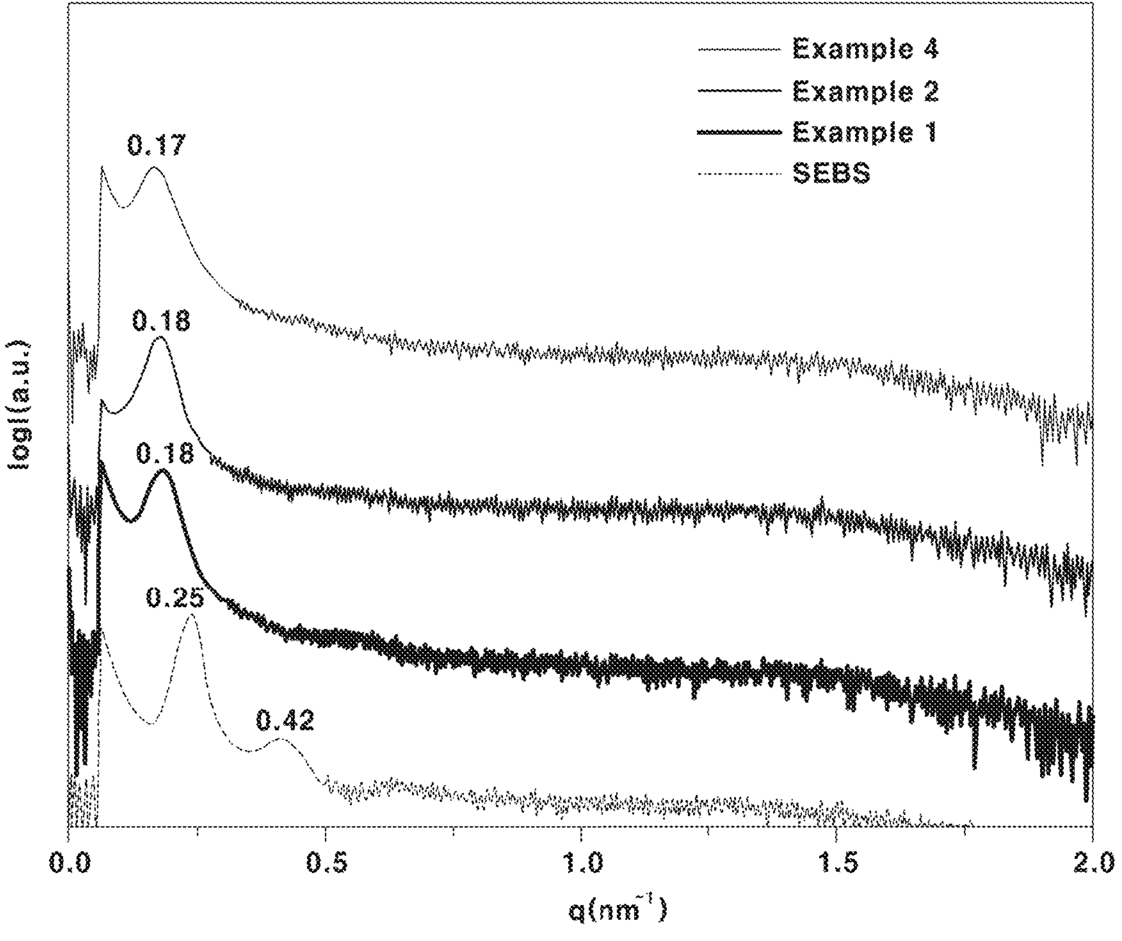
FIG. 6A shows the microstructures and self-assembly behaviors of the electrolyte membranes according to Examples 1, 2 and 4 before heat treatment.
Figure 6B:
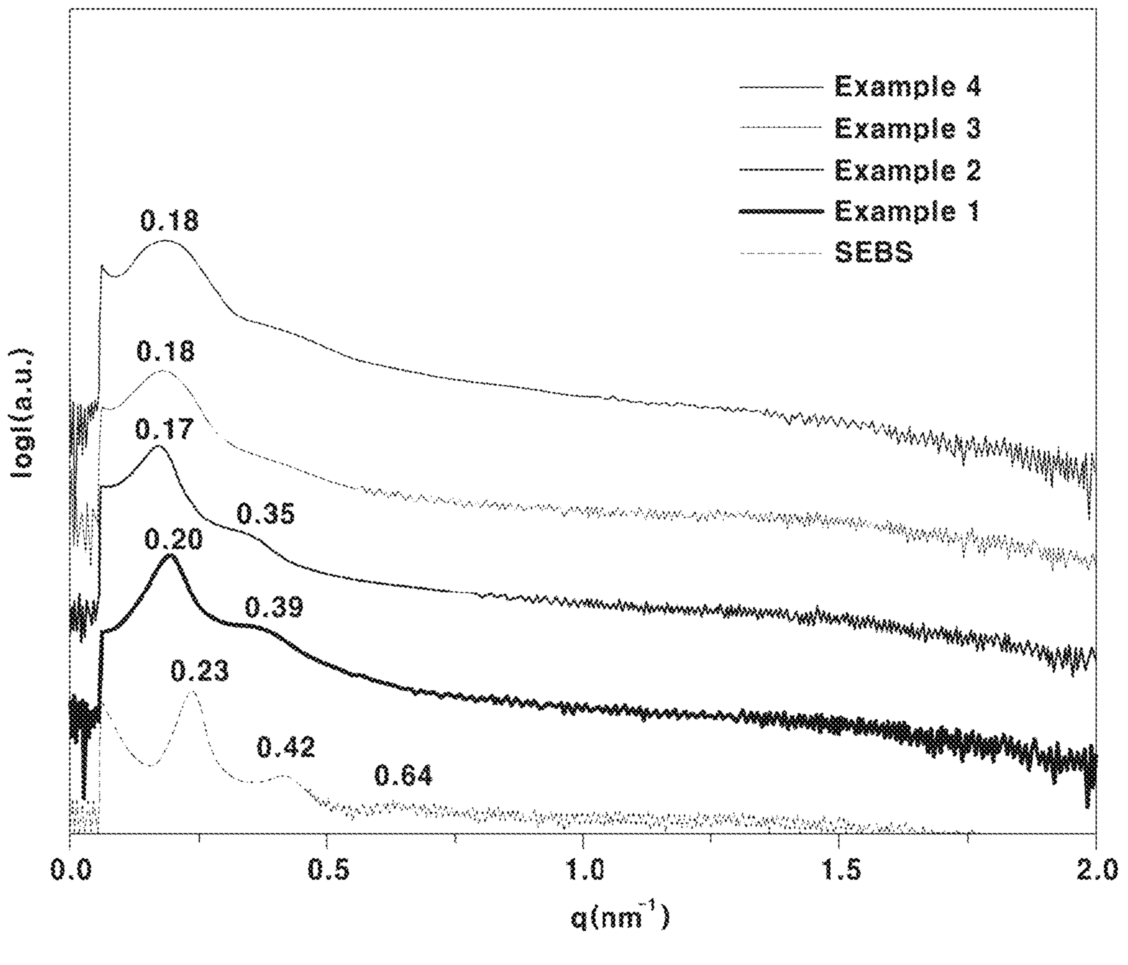
FIG. 6B shows the microstructures and self-assembly behaviors of the electrolyte membranes according to Examples 1 to 4 after heat treatment.

FIG. 6A shows self-assembly behaviors of the electrolyte membranes according to Examples 1, 2 and 4 before heat treatment. FIG. 6B shows the microstructures and self-assembly behaviors of the electrolyte membranes according to Examples 1 to 4 after heat treatment. Each result was analyzed by small angle x-ray scattering (SAXS). Styrene ethylene-butylene styrene (SEBS) was also analyzed as a Comparative Example.

In SEBS, a SAXS peak having a cylindrical structure is observed. Comparing FIG. 6A with FIG. 6B, dissociation of the neopentyl group occurs during the heat treatment process, and an ordered structure is formed. It can be seen that, in Example 1 (n=2) and Example 2 (n=5), the $2^{nd}$ peak is observed and a shift to a lamellar structure occurs.

As is apparent from the foregoing, according to embodiments of the present disclosure, it is possible to obtain an ionomer for a fuel cell capable of self-assembly and a method of preparing the same.

The effects of embodiments of the present disclosure are not limited to those mentioned above. It should be understood that the effects of embodiments of the present disclosure include all effects that can be inferred from the foregoing description of embodiments of the present disclosure.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An ionomer for a fuel cell, the ionomer comprising:

a copolymer having no carbon-oxygen bond, wherein the copolymer comprises:

first blocks disposed at both ends, wherein each first block comprises a first styrene unit and a side chain grafted to the first styrene unit, wherein the side chain comprises a repeating unit comprising a second styrene unit and a proton conductive functional group grafted to the second styrene unit; and a second block interposed between the first blocks, wherein the second block comprises an ethylene-based unit, a butylene-based unit, an isoprene-based unit, or any combination thereof.

2. The ionomer according to claim 1, wherein the copolymer has a micelle structure, wherein the second block is located inside of the micelle structure and the first blocks are located outside of the micelle structure.

3. The ionomer according to claim 1, wherein the proton conductive functional group comprises a sulfonic acid group.

4. The ionomer according to claim 1, wherein the copolymer comprises a compound represented by

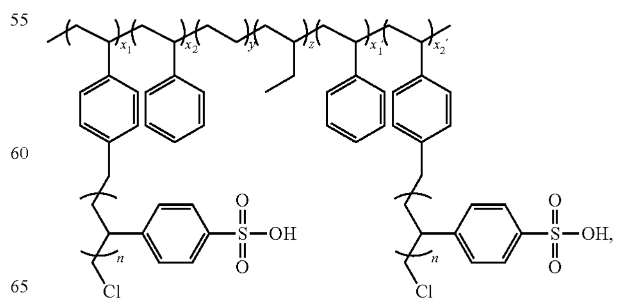

wherein $x_1=x\times a$, $x_2=x\times(1-a)$, a is a number from 0.1 to 0.9, and x is a number from 10 to 1,000;

wherein $x_1'=x'\times(1-a')$, $x_2'=x'\times a'$, a' is a number from 0.1 to 0.9, and x' is a number from 10 to 1,000;

wherein y is a number from 10 to 1,000;

wherein z is a number from 10 to 1,000; and wherein n is a number from 2 to 12.

5. A method of forming the fuel cell comprising the ionomer of claim 1, the method comprising:

providing an electrolyte membrane;

disposing a cathode on a first surface of the electrolyte membrane; and disposing an anode on a second surface of the electrolyte membrane; and wherein the electrolyte membrane, the cathode, or the anode comprises the ionomer.

6. The method according to claim 5, wherein the copolymer has a micelle structure, wherein the second block is located inside of the micelle structure and the first blocks are located outside of the micelle structure.

7. The method according to claim 5, wherein the proton conductive functional group comprises a sulfonic acid group.

8. The method according to claim 5, wherein the copolymer comprises a compound represented by

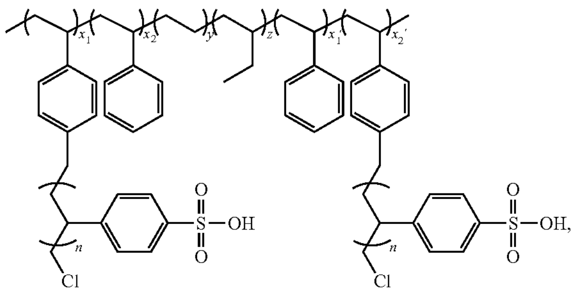

wherein $x_1=x\times a$, $x_2=x\times(1-a)$, a is a number from 0.1 to 0.9, and x is a number from 10 to 1,000;

wherein $x_1'=x'\times(1-a')$, $x_2'=x'\times a'$, a' is a number from 0.1 to 0.9, and x' is a number from 10 to 1,000;

wherein y is a number from 10 to 1,000;

wherein z is a number from 10 to 1,000; and wherein n is a number from 2 to 12.

9. A fuel cell comprising:

an electrolyte membrane;

a cathode disposed on a first surface of the electrolyte membrane; and an anode disposed on a second surface of the electrolyte membrane; and wherein the electrolyte membrane, the cathode, or the anode comprises an ionomer comprising a copolymer having no carbon-oxygen bond, wherein the copolymer comprises:

first blocks disposed at both ends, wherein each first block comprises a first styrene unit and a side chain grafted to the first styrene unit, wherein the side chain comprises a repeating unit comprising a second styrene unit and a proton conductive functional group grafted to the second styrene unit; and a second block interposed between the first blocks, wherein the second block comprises an ethylene-based unit, a butylene-based unit, an isoprene-based unit, or any combination thereof.

10. The fuel cell according to claim 9, wherein the copolymer has a micelle structure, wherein the second block is located inside of the micelle structure and the first blocks are located outside of the micelle structure.

11. The fuel cell according to claim 9, wherein the proton conductive functional group comprises a sulfonic acid group.

12. The fuel cell according to claim 9, wherein the copolymer comprises a compound represented by

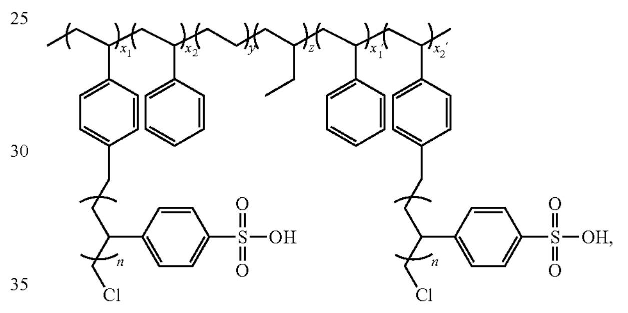

wherein $x_1=x\times a$, $x_2=x\times(1-a)$, a is a number from 0.1 to 0.9, and x is a number from 10 to 1,000;

wherein $x_1'=x'\times(1-a')$, $x_2'=x'\times a'$, a' is a number from 0.1 to 0.9, and x' is a number from 10 to 1,000;

wherein y is a number from 10 to 1,000;

wherein z is a number from 10 to 1,000; and wherein n is a number from 2 to 12.

13. A method for preparing the ionomer for the fuel cell of claim 1, the method comprising:

reacting a starting material comprising chloromethylated styrene ethylene-butylene styrene (CMSEBS) and a monomer having a sulfonic acid-protecting group to obtain an intermediate material represented by

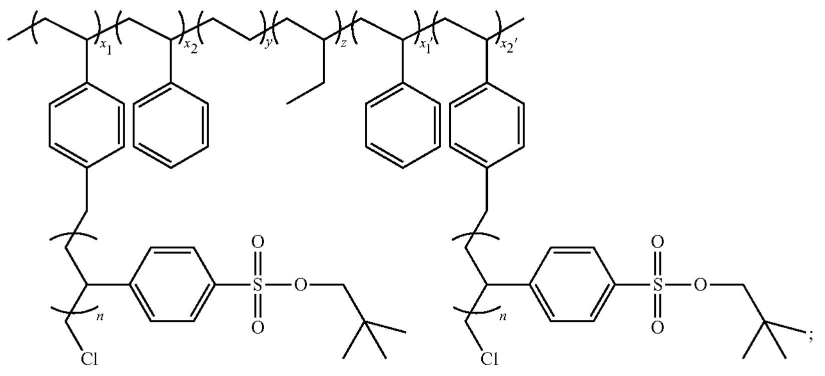

and removing the sulfonic acid-protecting group from the intermediate material to obtain the ionomer represented by

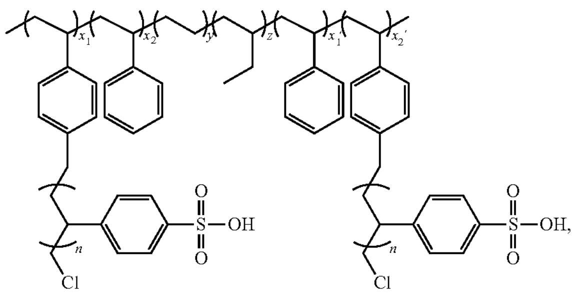

wherein $x_1 = x \times a$, $x_2 = x \times (1-a)$, a is a number from 0.1 to 0.9, and x is a number from 10 to 1,000;

wherein $x_1' = x' \times (1-a')$, $x_2' = x' \times a'$, a' is a number from 0.1 to 0.9, and x' is a number from 10 to 1,000;

wherein y is a number from 10 to 1,000;

wherein z is a number from 10 to 1,000; and wherein n is a number from 2 to 12.

14. The method according to claim 13, wherein the monomer having the sulfonic acid-protecting group comprises a compound represented by

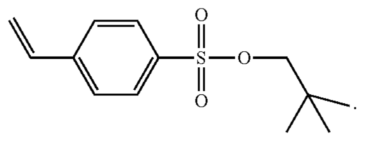 [SMILES: C=Cc1ccc(S(=O)(=O)OCC(C)(C)C)cc1]

15. The method according to claim 13, wherein the starting material further comprises copper halide and 2,2'-bipyridine.

16. The method according to claim 13, wherein the starting material further comprises copper halide and 2,2'-bipyridine in a mole ratio of 1:1 to 1:3.

17. The method according to claim 13, wherein the intermediate material is obtained by reacting the starting material at a temperature of 50° C. to 150° C. for 1 hour to 48 hours.

18. The method according to claim 13, wherein the ionomer is obtained by removing the sulfonic acid-protecting group by heat-treating the intermediate material at a temperature of 100° C. to 200° C. for 1 hour to 4 hours.

19. An ionomer for a fuel cell, the ionomer comprising:

a copolymer having no carbon-oxygen bond, wherein the copolymer comprises:

first blocks disposed at both ends, wherein each first block comprises a first styrene unit and a proton conductive functional group; and a second block interposed between the first blocks, wherein the second block comprises an ethylene-based unit, a butylene-based unit, an isoprene-based unit, or any combination thereof;

wherein the copolymer comprises a compound represented by

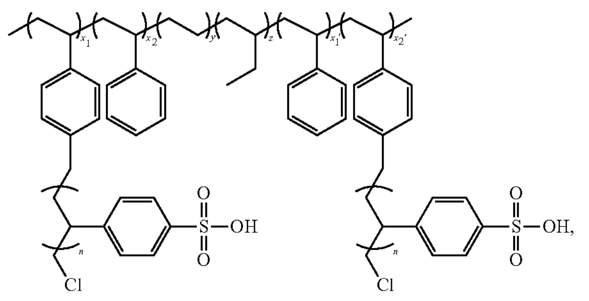

wherein $x_1 = x \times a$, $x_2 = x \times (1-a)$, a is a number from 0.1 to 0.9, and x is a number from 10 to 1,000;

wherein $x_1' = x' \times (1-a')$, $x_2' = x' \times a'$, a' is a number from 0.1 to 0.9, and x' is a number from 10 to 1,000;

wherein y is a number from 10 to 1,000;

wherein z is a number from 10 to 1,000; and wherein n is a number from 2 to 12.

20. The ionomer according to claim 19, wherein the proton conductive functional group comprises a sulfonic acid group.

* * * * *